United States Patent
Inoue et al.

(10) Patent No.: US 10,528,498 B2
(45) Date of Patent: Jan. 7, 2020

(54) TRANSFER APPARATUS AND FRAME TRANSFER METHOD

(71) Applicant: Mitsubishi Electric Corporation, Tokyo (JP)

(72) Inventors: Ayako Inoue, Tokyo (JP); Sachiko Taniguchi, Tokyo (JP); Yuji Goto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/303,309

(22) PCT Filed: Jul. 28, 2016

(86) PCT No.: PCT/JP2016/072213
§ 371 (c)(1),
(2) Date: Nov. 20, 2018

(87) PCT Pub. No.: WO2018/020645
PCT Pub. Date: Feb. 1, 2018

(65) Prior Publication Data
US 2019/0213151 A1     Jul. 11, 2019

(51) Int. Cl.
*G06F 13/20* (2006.01)
*H04L 12/26* (2006.01)

(52) U.S. Cl.
CPC .............. *G06F 13/20* (2013.01); *H04L 43/08* (2013.01); *G06F 2213/0064* (2013.01)

(58) Field of Classification Search
CPC ... G06F 2213/0064; G06F 13/20; H04L 43/08
See application file for complete search history.

(56) References Cited

U.S. PATENT DOCUMENTS

| 6,144,668 A * | 11/2000 | Bass ...................... H04L 45/00 370/401 |
| 2017/0041243 A1 | 2/2017 | Nakayasu et al. |
| 2018/0183708 A1* | 6/2018 | Farkas .................... H04L 45/38 |

FOREIGN PATENT DOCUMENTS

| JP | 8-32615 A | 2/1996 |
| JP | 2012-34047 A | 2/2012 |
| WO | WO 2015/163094 A1 | 10/2015 |

OTHER PUBLICATIONS

Inoue et al., "A Prototype Evaluation of Low Latency Ethernet Switch with Frame Preemption," IEICE Technical Report, vol. 115, No. 123, Jun. 25, 2015, 8 pages.

(Continued)

*Primary Examiner* — Glenn A. Auve
(74) *Attorney, Agent, or Firm* — Birch, Stewart, Kolasch & Birch, LLP

(57) ABSTRACT

A transfer apparatus has an input port and an output port, an input line speed of the input port and an output line speed of the output port being capable of being set to differ from each other. The transfer apparatus comprises, for each output port: a low-latency frame transmission buffer to store a low-latency frame received at the input port; a normal-latency frame transmission buffer to store a normal-latency frame that is a frame received at the input port, the normal-latency frame being permitted to be transferred with higher latency than the low-latency frame; a time calculation unit to calculate output start time of the low-latency frame by using information on a frame length of the low-latency frame, the input line speed, and the output line speed when the low-latency frame is received; and an output contention control unit to control transfer of the low-latency frame and the normal-latency frame by using the output start time.

7 Claims, 7 Drawing Sheets

(56) References Cited

OTHER PUBLICATIONS

LAN/MAN Standards Committee of the IEEE Computer Society, "Draft Standard for Ethernet Amendment: Specification and Management Parameters for Interspersing Express Traffic," IEEE P802.3br™/D2.3, Oct. 22, 2015, 57 pages.
Notice of Reasons for Refusal issued in Japanese Application No. 2016-575707, dated Apr. 5, 2017.
Extended European Search Report, dated Jun. 18, 2019, for European Application No. 16910548.3.

* cited by examiner

TRANSFER APPARATUS AND FRAME TRANSFER METHOD

FIELD

The present invention relates to a transfer apparatus that transfers a frame and a frame transfer method.

BACKGROUND

In recent years, Ethernet (registered trademark) has been increasingly employed in networks in industrial fields, for example, in automobiles, trains or factories. Frames used in industrial Ethernet networks generally include a control system frame, which is a frame that handles device control information, and a frame that handles information other than that on the control system, for example, video or voice. The control system frame needs transferring with low latency to meet a strict latency request for high speed and high reliability. Such a control system frame is hereinafter referred to as a "low-latency frame". On the other hand, a frame that handles other information than that on the control system is hereinafter referred to as "a normal-latency frame" that should meet a less strict latency request.

Industrial Ethernet networks can include applications using different line speeds and transfer apparatuses including their ports having different line speeds. When the transfer apparatus transfers a frame from a port with a low line speed to a port with a high line speed, the transfer apparatus needs to store frame data so that underrun does not occur when the frame input from the low speed port is output. Patent Literature 1 discloses a technique for starting to transfer frames to a high speed port either after completing frame reception at a low speed input port or after waiting for a length of time ensuring no occurrence of underrun of frames being transferred from the low speed port to the high speed port.

In addition, Institute of Electrical and Electronic Engineers (IEEE) 802.3br proceed with standardization of media access control (MAC) employing interspersing express traffic (IET) technology for reducing transfer latency time of low-latency frames in transfer apparatuses. For the IET, when a low-latency frame becomes transferable during transfer of a normal-latency frame, interrupt transfer of the low-latency frame is performed as the ongoing transfer of the normal-latency frame is suspended and the normal-latency frame is divided to the extent that satisfies a minimum frame length of Ethernet and a post-division minimum frame length specified to be greater than the minimum frame length of Ethernet. A transfer apparatus including the MAC employing the IET can reduce transfer latency time of low-latency frames in the industrial Ethernet networks.

CITATION LIST

Patent Literature

Patent Literature 1: Japanese Patent Application Laid-open No. H8-32615

SUMMARY

Technical Problem

A transfer apparatus of a network that accommodates a plurality of application systems having different transfer speeds and requires reduction in latency time of low-latency frames is configured to include the MAC employing the IET in addition to the configuration described in Patent Literature 1. Such a transfer apparatus does not output a low-latency frame, input at a low speed port, from a high speed port corresponding to the IET until the low-latency frame is stored to reach a frame length ensuring no occurrence of underrun. At that time, the transfer apparatus determines whether a normal-latency frame can be divided, after the low-latency frame can be output. When the normal-latency frame cannot be divided, the transfer apparatus starts output of the low-latency frame after completion of the output of the normal-latency frame. Thus, a problem with the transfer apparatus is that the latency time of the low-latency frame undesirably increases.

The present invention has been made in view of the above, and an object thereof is to provide a transfer apparatus capable of suppressing transfer latency of low-latency frames when an input line speed and an output line speed are different from each other.

Solution to Problem

The present invention provides a transfer apparatus for solving the above-described problem and achieving the object. The transfer apparatus has an input port and an output port, an input line speed of the input port and an output line speed of the output port being capable of being set to differ from each other. The transfer apparatus comprises, for each output port: a low-latency frame transmission buffer to store a low-latency frame received at the input port; and a normal-latency frame transmission buffer to store a normal-latency frame that is a frame received at the input port, the normal-latency frame being permitted to be transferred with higher latency than the low-latency frame. The transfer apparatus further comprises, for each output port: a time calculation unit; and an output contention control unit. The time calculation unit calculates output start time of the low-latency frame by using information on a frame length of the low-latency frame, the input line speed, and the output line speed when the low-latency frame is received. The output contention control unit controls transfer of the low-latency frame and the normal-latency frame by using the output start time.

Advantageous Effects of Invention

The transfer apparatus according to the present invention achieves an effect of suppressing transfer latency of low-latency frames when an input line speed and an output line speed are different from each other.

DESCRIPTION OF EMBODIMENTS

Hereinafter, a transfer apparatus and a frame transfer method according to each embodiment of the present invention will be described in detail with reference to the drawings. The invention is not limited to the embodiments.

First Embodiment

Figure 1:
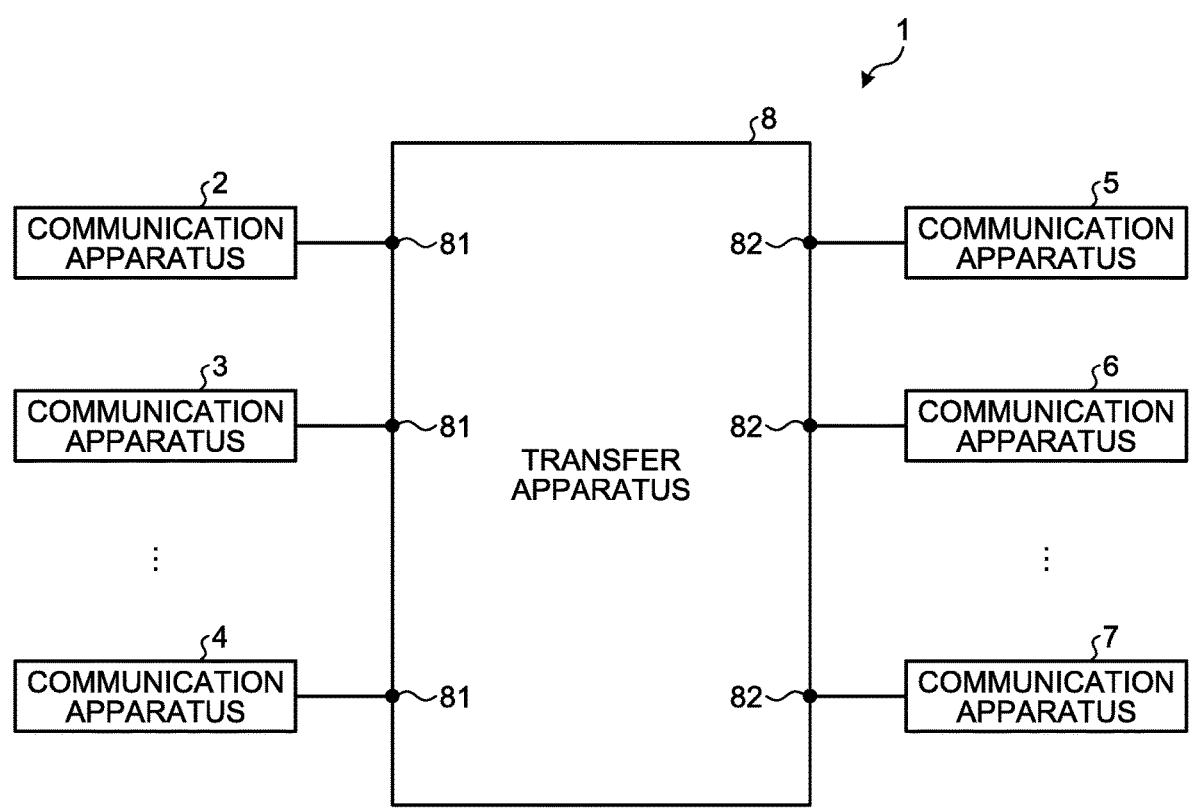
FIG. 1 is a diagram illustrating an example configuration of a communication system according to a first embodiment.

FIG. 1 is a diagram illustrating an example configuration of a communication system 1 according to a first embodiment of the present invention. The communication system 1 includes communication apparatuses 2, 3, and 4 on a transmission side, communication apparatuses 5, 6, and 7 on a reception side, and a transfer apparatus 8. The transfer apparatus 8 receives signals from the communication apparatuses 2 to 4 on the transmission side, and transfers the signals to the communication apparatuses 5 to 7 on the reception side. The communication apparatuses 2 to 4 on the transmission side transmit frames of user data and the like, and the communication apparatuses 5 to 7 on the reception side receive frames of user data and the like. The transfer apparatus 8 is connected at its input ports 81 to the communication apparatuses 2 to 4 on the transmission side. The transfer apparatus 8 is connected at its output ports 82 to the communication apparatuses 5 to 7 on the reception side. The communication apparatuses 2 to 7 may have different data transfer speeds. FIG. 1 illustrates the three communication apparatuses on the transmission side and the three communication apparatuses on the reception side, which is merely an example. It will be appreciated that the number of the communication apparatuses on each of the transmission side and the reception side may be two or less, or four or more. The communication system 1 illustrated in FIG. 1 is configured to include one transfer apparatus 8, which is merely an example. It will be appreciated that the communication system 1 may be configured to include a plurality of transfer apparatuses 8 arranged in series between the set of the communication apparatuses 2 to 4 on the transmission side and the set of the communication apparatuses 5 to 7 on the reception side.

Figure 2:
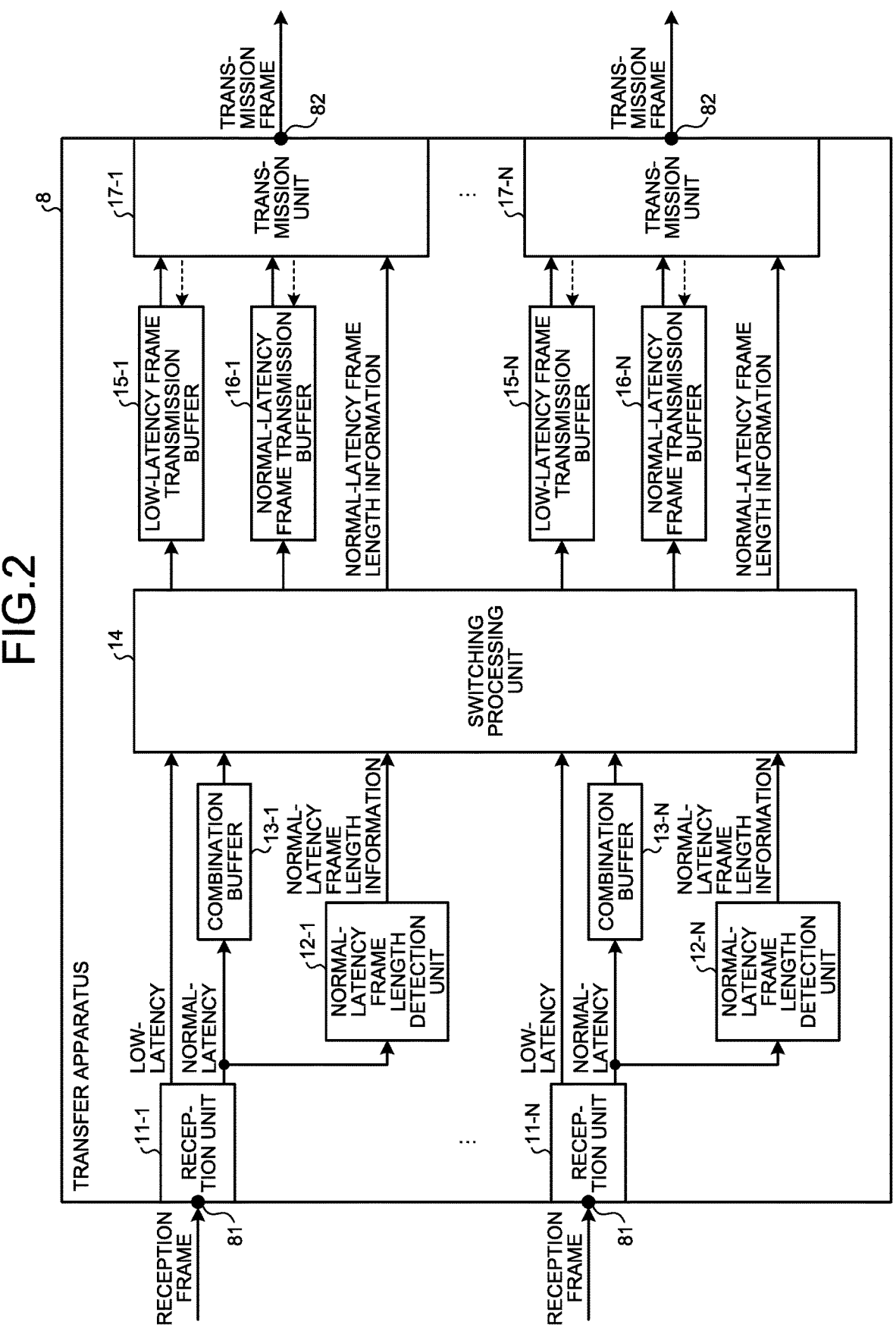
FIG. 2 is a block diagram illustrating an example configuration of a transfer apparatus according to the first embodiment.

A configuration of the transfer apparatus 8 will be described. FIG. 2 is a block diagram illustrating an example configuration of the transfer apparatus 8 according to the first embodiment. The transfer apparatus 8 includes reception units 11-1 to 11-N, normal-latency frame length detection units 12-1 to 12-N, combination buffers 13-1 to 13-N, a switching processing unit 14, low-latency frame transmission buffers 15-1 to 15-N, normal-latency frame transmission buffers 16-1 to 16-N, and transmission units 17-1 to 17-N. The transfer apparatus 8 includes N input ports 81 and N output ports 82, which is merely an example. It will be appreciated that the numbers of the input ports 81 and the output ports 82 are not limited to N. N is an integer of 1 or more. For N=1, the number of the respective components of the transfer apparatus 8 is one.

Hereinafter, each of the reception units 11-1 to 11-N is referred to as "reception unit 11" when the reception units 11-1 to 11-N need not be individually referred to. Similarly, each of the normal-latency frame length detection units 12-1 to 12-N is referred to as "normal-latency frame length detection unit 12" when the normal-latency frame length detection units 12-1 to 12-N need not be individually referred to. Further, each of the combination buffers 13-1 to 13-N is referred to as "combination buffer 13" when the combination buffers 13-1 to 13-N need not be individually referred to. Further, each of the low-latency frame transmission buffers 15-1 to 15-N is referred to as "low-latency frame transmission buffer 15" when the low-latency frame transmission buffers 15-1 to 15-N need not be individually referred to. Further, each of the normal-latency frame transmission buffers 16-1 to 16-N is referred to as "normal-latency frame transmission buffer 16" when the normal-latency frame transmission buffers 16-1 to 16-N need not be individually referred to. Further, each of the transmission units 17-1 to 17-N is referred to as "transmission unit 17" when the transmission units 17-1 to 17-N need not be individually referred to.

The transfer apparatus 8 includes the reception unit 11, the normal-latency frame length detection unit 12, and the combination buffer 13 on an input port-by-input port basis. The number of the reception units 11, the number of the normal-latency frame length detection units 12, and the number the combination buffer 13 are each N, which is the same as the number of the input ports 81. In addition, the transfer apparatus 8 includes the low-latency frame transmission buffer 15, the normal-latency frame transmission buffer 16, and the transmission unit 17 on an output port-by-output port basis. The number of the low-latency frame transmission buffers 15, the number of the normal-latency frame transmission buffers 16, and the number of the transmission units 17 are each N, which is the same as the number of the output ports 82. For the transfer apparatus 8 of the present embodiment, the input line speed of the input port 81 is different from the output line speed of the output port 82, and the output line speed of the output port 82 is higher than the input line speed of the input port 81. Alternatively, in the transfer apparatus 8, the input line speed of the input port 81 and the output line speed of the output port 82 may be the same.

IEEE 802.3br proceeds with standardization of MAC employing IET technology, and the MAC is implemented in the reception unit 11 of the input port 81 and the transmission unit 17 of the output port 82. For the IET, when a normal-latency frame is being transferred, the transfer of the normal-latency frame is suspended and interrupt transfer of a low-latency frame is performed, thereby achieving the transfer that satisfies a latency request of the low-latency frame. The low-latency frame is a frame required to be transferred with low latency. The normal-latency frame is a frame permitted to be transferred with more or higher latency than the low-latency frame.

For example, assuming that the communication system 1 includes a plurality of transfer apparatuses 8 arranged in series, in the IET, the transmission unit 17 of the transfer apparatus 8 on the transmission side divides the normal-latency frame when interrupt by the low-latency frame occurs. After completing the transfer of the low-latency frame, the transfer apparatus 8 on the transmission side transfers an untransmitted part defining the rest of the normal-latency frame. The transfer apparatus 8 on the reception side combines the normal-latency frame received before reception of the low-latency frame with the rest of the normal-latency frame received after the reception of the low-latency frame, thereby forming the pre-division normal-latency frame.

The combination buffer 13 performs a combination process of normal-latency frames. It is only required that the process of combining the post-division normal-latency frames be completed before the transmission unit 17 starts to control contended outputs with the low-latency frame by the IET in the transfer apparatus 8. For this reason, the combination buffer 13 may be installed anywhere before the transmission unit 17. Thus, the combination buffer 13 may be configured to double as the normal-latency frame transmission buffer 16.

The normal-latency frame length detection unit 12 measures the frame length of a normal-latency frame in units used before the division is made by the IET. The normal-latency frame length detection unit 12 measures, for example, the number of bytes of an input normal-latency frame. The normal-latency frame length detection unit 12 outputs, to the switching processing unit 14, normal-latency frame length information indicating the measured frame length of the normal-latency frame.

The reception unit 11 is connected to external apparatuses such as the communication apparatuses 2 to 4, and receives traffic in which normal-latency frames and low-latency frames of the IET are mixed. The reception frames illustrated in FIG. 2 are each a low-latency frame or a normal-latency frame. The reception unit 11 sorts out received frames into the low-latency frame and the normal-latency frame on the basis of identification information within the received frames, and outputs the low-latency frame and the normal-latency frame from separate paths. The identification information in a frame is, for example, information on a service type in a header attached to the frame.

Similarly, the transmission unit 17 is connected to external apparatuses such as the communication apparatuses 5 to 7, and outputs, by a transfer method of the IET, traffic in which low-latency frames and normal-latency frames are mixed. The transmission frames illustrated in FIG. 2 are each a low-latency frame or a normal-latency frame.

The switching processing unit 14 performs a destination search process on the basis of the information in frames of the low-latency frame and the normal-latency frame received, and delivers the low-latency frame and the normal-latency frame to the low-latency frame transmission buffer 15 and the normal-latency frame transmission buffer 16 associated with the output port 82 determined. The information in the frames is, for example, a MAC destination address, or virtual local area network (VLAN) tag information. The switching processing unit 14 outputs the normal-latency frame length information acquired from the normal-latency frame length detection unit 12 to the transmission unit 17 of the output port 82 that is an output destination of the normal-latency frame corresponding to the normal-latency frame length information.

The low-latency frame transmission buffer 15 stores the low-latency frame received by the input port 81. The low-latency frame transmission buffer 15 is capable of performing cut-through switching in which frame output is started without waiting for completion of storage of one frame. The low-latency frame transmission buffer 15 outputs the low-latency frame to the transmission unit 17 in accordance with a low-latency frame readout request from the transmission unit 17. When the low-latency frame is input from the switching processing unit 14 to the low-latency frame transmission buffer 15, the low-latency frame transmission buffer 15 outputs, to the transmission unit 17, low-latency frame reception notification indicating that the low-latency frame has been stored, i.e., the low-latency frame has been received in the transfer apparatus 8.

The normal-latency frame transmission buffer 16 stores the normal-latency frame received by the input port 81. The normal-latency frame transmission buffer 16 is capable of performing cut-through switching when a combined normal-latency frame provided by the combination buffer 13 is input to the normal-latency frame transmission buffer 16. In a case where the normal-latency frame transmission buffer 16 doubles as the combination buffer 13 as described above, when pre-combination normal-latency frames are input to the normal-latency frame transmission buffer 16, the normal-latency frame transmission buffer 16 performs store-and-forward switching in which output is started after storage of frames equivalent to one frame is completed. The normal-latency frame transmission buffer 16 outputs the normal-latency frame to the transmission unit 17 in accordance with a normal-latency frame readout request from the transmission unit 17. In addition, the normal-latency frame transmission buffer 16 outputs, to the transmission unit 17, normal-latency frame storage information indicating a state of storage of the normal-latency frame in the normal-latency frame transmission buffer 16.

Figure 3:
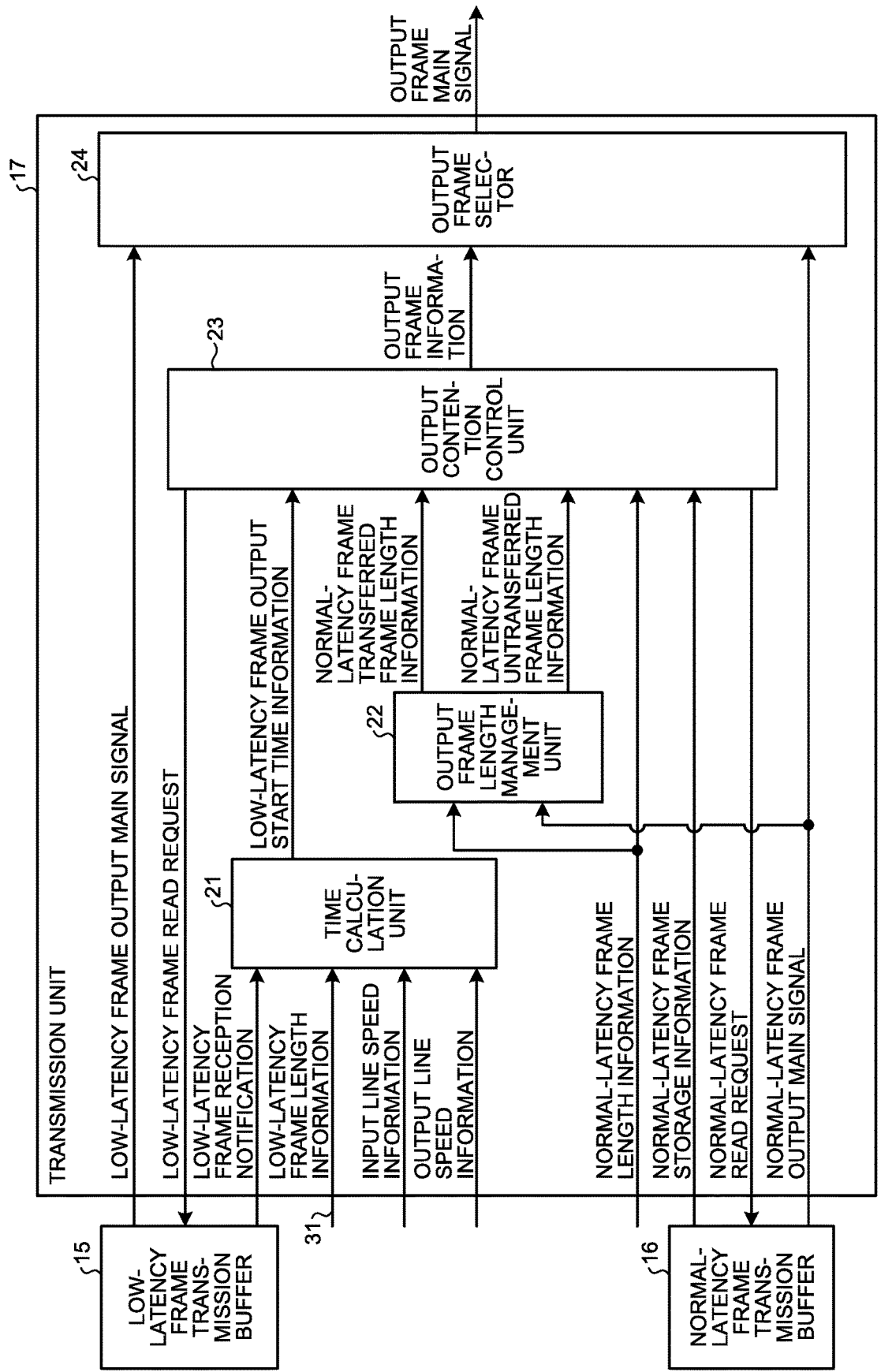
FIG. 3 is a block diagram illustrating an example configuration of a transmission unit according to the first embodiment.

Next, a configuration of the transmission unit 17 will be described in detail. FIG. 3 is a block diagram illustrating an example configuration of the transmission unit 17 according to the first embodiment. The transmission unit 17 includes a time calculation unit 21, an output frame length management unit 22, an output contention control unit 23, and an output frame selector 24.

Upon receiving the low-latency frame reception notification from the low-latency frame transmission buffer 15, the time calculation unit 21 calculates low-latency frame output start time T by using the low-latency frame length information 31, an input line speed of the input port 81 having received the input of the low-latency frame, and an output line speed of the output port 82 outputting the low-latency frame. The low-latency frame output start time T is time at which it becomes possible to output the low-latency frame from the low-latency frame transmission buffer 15. The low-latency frame length information 31 indicates the maximum frame length of the low-latency frame that can be transferred by the transfer apparatus 8. The input line speed is indicated by input line speed information. The output line speed is indicated by output line speed information. The low-latency frame output start time T is output start time at which the amount of the stored low-latency frame reaches an amount that prevents an error, specifically, underrun from occurring in the low-latency frame transmission buffer 15 when the low-latency frame transmission buffer 15 starts outputting, i.e., transferring the low-latency frame therefrom. When the low-latency frame length information 31, the input line speed information, and the output line speed information are not changed during the operation of the communication system 1, an administrator of the communication system 1 can set these pieces of information in advance in the time calculation unit 21. As will be described later in a second embodiment, the time calculation unit 21 can acquire the low-latency frame length information 31 from the received low-latency frame. The time calculation unit 21 may acquire the input line speed information from a monitoring unit (not illustrated) that monitors the line speed of the input port 81 in the reception unit 11, and may acquire the output line speed information from a monitoring unit (not illustrated) that monitors the line speed of the output port 82 in the transmission unit 17.

When the time calculation unit 21 receives the low-latency frame reception notification, that is, when the low-latency frame is received in the transfer apparatus 8, the time calculation unit 21 calculates the low-latency frame output start time T on the basis of the low-latency frame length information 31 and a difference between the input line speed and the output line speed. The time calculation unit 21 can uniquely determine the low-latency frame output start time T from the difference between the input line speed and the output line speed and the low-latency frame length information 31 of the low-latency frame. The low-latency frame output start time T may be relative time, i.e., time defined as a difference from time at which the time calculation unit 21 received the low-latency frame reception notification. Alternatively, the low-latency frame output start time T may be absolute time managed by the communication system 1, the transfer apparatus 8, or the like. The time calculation unit 21 notifies the output contention control unit 23 of the low-latency frame output start time information indicating the low-latency frame output start time T.

On the basis of the normal-latency frame length information acquired from the normal-latency frame length detection unit 12 via the switching processing unit 14 and the normal-latency frame output main signal output from the normal-latency frame transmission buffer 16, the output frame length management unit 22 calculates a transferred frame length of the normal-latency frame and an untransferred frame length of the normal-latency frame. The transferred frame length of the normal-latency frame is a frame length of the normal-latency frame that has been output from the normal-latency frame transmission buffer 16 and transferred from the transfer apparatus 8. The untransferred frame length of the normal-latency frame is a frame length of the normal-latency frame that has not yet been transferred from the transfer apparatus 8. In particular, the untransferred frame length of the normal-latency frame is the frame length of the normal-latency frame that has been stored in the normal-latency frame transmission buffer 16, but has not yet been output from the normal-latency frame transmission buffer 16. The output frame length management unit 22 notifies the output contention control unit 23 of normal-latency frame transferred frame length information and normal-latency frame untransferred frame length information. The normal-latency frame transferred frame length information indicates the transferred frame length of the normal-latency frame. The normal-latency frame untransferred frame length information indicates the untransferred frame length of the normal-latency frame.

The output contention control unit 23 performs output control by the IET. Specifically, the output contention control unit 23 controls transfer of the low-latency frame and the normal-latency frame on the basis of: the low-latency frame output start time information notified by the time calculation unit 21; the normal-latency frame transferred frame length information and the normal-latency frame untransferred frame length information notified by the output frame length management unit 22; the normal-latency frame length information acquired from the normal-latency frame length detection unit 12 via the switching processing unit 14; and the normal-latency frame storage information notified by the normal-latency frame transmission buffer 16. That is, the output contention control unit 23 determines which one of the low-latency frame and the normal-latency frame is to be transferred. The output contention control unit 23 can suppress transfer latency of the low-latency frame by starting outputting the low-latency frame at the low-latency frame output start time T indicated by the low-latency frame output start time information. The output contention control unit 23 notifies the output frame selector 24 of output frame information indicating which one of the low-latency frame and the normal-latency frame is to be transferred.

When the output contention control unit 23 determines to transfer the low-latency frame, the output contention control unit 23 outputs the low-latency frame readout request to the low-latency frame transmission buffer 15. Upon receiving the low-latency frame readout request from the output contention control unit 23, the low-latency frame transmission buffer 15 outputs a low-latency frame output main signal to the output frame selector 24. As a result, the output frame selector 24 can read out the low-latency frame output main signal.

When the output contention control unit 23 determines to transfer the normal-latency frame, the output contention control unit 23 outputs the normal-latency frame readout request to the normal-latency frame transmission buffer 16. Upon receiving the normal-latency frame readout request from the output contention control unit 23, the normal-latency frame transmission buffer 16 outputs a normal-latency frame output main signal to the output frame selector 24. As a result, the output frame selector 24 can read out the normal-latency frame output main signal.

The output frame selector 24 selects either the low-latency frame output main signal read from the low-latency frame transmission buffer 15 or the normal-latency frame output main signal read from the normal-latency frame transmission buffer 16 on the basis of the output frame information determined by the output contention control unit 23, such that the output frame selector 24 outputs the selected signal as an output frame main signal from the output port 82.

In the present embodiment, there are no particular limitations on the number of priority classes and the number of frame length types of the frames handled in the output control method with IET control of the transfer apparatus 8.

Figure 4:
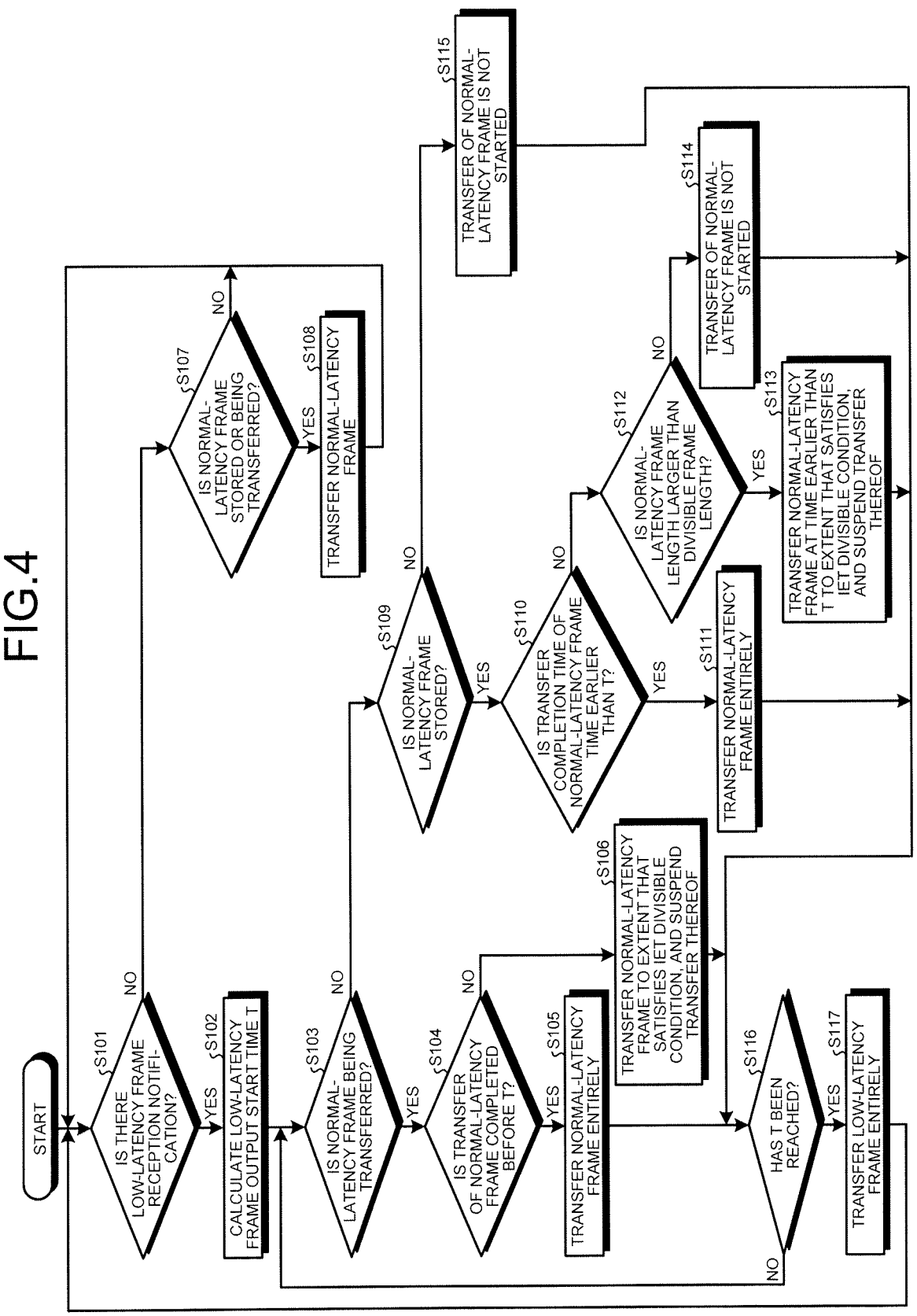
FIG. 4 is a flowchart illustrating a process of priority output control of a low-latency frame by IET in a case where a transfer speed of an output port is higher than a transfer speed of an input port in the transmission unit according to the first embodiment.

Next, an operation of the transmission unit 17 of the transfer apparatus 8 will be described. As described above, the transfer apparatus 8 includes the transmission unit 17 provided for each output port 82. Although one output port 82 will be described below, it is noted that the transmission units 17 for all the output ports 82 of the transfer apparatus 8 perform the same operations. FIG. 4 is a flowchart illustrating a process of priority output control of a low-latency frame by the IET in a case where a transfer speed of the output port 82 is higher than a transfer speed of the input port 81 in the transmission unit 17 according to the first embodiment.

First, in the transmission unit 17, the time calculation unit 21 checks whether there is a low-latency frame reception notification from the low-latency frame transmission buffer 15 (Step S101). When there is the low-latency frame reception notification from the low-latency frame transmission buffer 15 (Step S101: Yes), the time calculation unit 21 senses that the low-latency frame has been received in the transfer apparatus 8 and that the low-latency frame has been stored in the low-latency frame transmission buffer 15.

When there is the low-latency frame reception notification from the low-latency frame transmission buffer 15 (Step S101: Yes), the time calculation unit 21 calculates the low-latency frame output start time T on the basis of the low-latency frame length information 31 and the difference between the input line speed of the input port 81 and the output line speed of the output port 82 (Step S102). The time calculation unit 21 notifies the output contention control unit 23 of the calculated low-latency frame output start time T.

Upon receiving the notification of the low-latency frame output start time T from the time calculation unit 21, the output contention control unit 23 determines whether the normal-latency frame is being transferred (Step S103). When the normal-latency frame is being transferred (Step S103: Yes), the output contention control unit 23 determines whether the transfer of the normal-latency frame is completed before the low-latency frame output start time T on the basis of the untransferred frame length of the normal-latency frame being transferred, which frame length is indicated by the normal-latency frame untransferred frame length information notified by the output frame length management unit 22 (Step S104).

When the output contention control unit 23 determines that the transfer of the normal-latency frame is completed before the low-latency frame output start time T (Step S104: Yes), the output contention control unit 23 continues the ongoing transfer of the normal-latency frame until the last part of the frame is transferred (Step S105), such that the transfer of the normal-latency frame is completed.

When the output contention control unit 23 determines that the transfer of the normal-latency frame is not completed before the low-latency frame output start time T (Step S104: No), the output contention control unit 23 continues the transfer of the normal-latency frame to the extent that satisfies an IET divisible condition. The output contention control unit 23 suspends the transfer of the normal-latency frame (Step S106) afterward. That is, the output contention control unit 23 divides the normal-latency frame with a divisible frame length being left, and suspends the transfer of the normal-latency frame. The IET-divided normal-latency frame must have its last frame having the frame length equal to or more than 64 bytes which is the minimum frame length of Ethernet. It is thus necessary for a frame other than the last frame of the IET-divided frame to satisfy the specified minimum frame length of 64 bytes or more. The output contention control unit 23 transfers and suspends the transfer of the normal-latency frame within a range that satisfies the divisible condition.

In suspending the transfer of the normal-latency frame, the output contention control unit 23 transfers the normal-latency frame until the low-latency frame output start time T or time of completion of the transfer of the frame length obtained by excluding the divisible minimum frame length from the untransferred portion of the normal-latency frame, whichever comes earlier. As a result, the output contention control unit 23 can reduce the transfer latency of the normal-latency frame as the output contention control unit 23 suppresses an increase in the transfer time of the normal-latency frame when transferring an untransmitted portion of the normal-latency frame after the transfer of the low-latency frame.

Reference is made back to Step S101. When there is no low-latency frame reception notification from the low-latency frame transmission buffer 15 (Step S101: No), that is, when the low-latency frame is not received by the transfer apparatus 8 and thus the time calculation unit 21 cannot sense that the low-latency frame has been stored in the low-latency frame transmission buffer 15, the time calculation unit 21 does not calculate the low-latency frame output start time T. Therefore, the time calculation unit 21 does not notify the output contention control unit 23 of the low-latency frame output start time information. In a situation in which the output contention control unit 23 is notified of the low-latency frame output start time information by the time calculation unit 21, the output contention control unit 23 determines, on the basis of the normal-latency frame storage information from the normal-latency frame transmission buffer 16, whether the normal-latency frame is stored in the normal-latency frame transmission buffer 16 or whether the normal-latency frame is being transferred (Step S107).

When the output contention control unit 23 determines that the normal-latency frame is stored in the normal-latency frame transmission buffer 16 or that the normal-latency frame is being transferred (Step S107: Yes), the output contention control unit 23 transfers the normal-latency frame from the normal-latency frame transmission buffer 16 (Step S108). When the normal-latency frame is being transferred, the output contention control unit 23 continues the transfer of the normal-latency frame.

When the determination of the output contention control unit 23 in Step S107 is "NO", the transfer apparatus 8 returns to the process of Step S101. Alternatively, after the process in Step S108 is completed, the transfer apparatus 8 returns to the process of Step S101.

Reference is made back to Step S103. When the normal-latency frame is not being transferred (Step S103: No), the output contention control unit 23 determines whether the normal-latency frame is stored in the normal-latency frame transmission buffer 16 on the basis of the normal-latency frame storage information from the normal-latency frame transmission buffer 16 (Step S109).

When the output contention control unit 23 determines that the normal-latency frame is stored in the normal-latency frame transmission buffer 16 (Step S109: Yes), the output contention control unit 23 calculates time at which transfer of the normal-latency frame is completed if the transfer of the normal-latency frame is started, on the basis of the normal-latency frame length information acquired from the normal-latency frame length detection unit 12 via the switching processing unit 14. The output contention control unit 23 then determines whether the calculated transfer completion time of the normal-latency frame is earlier than the low-latency frame output start time T (Step S110).

When the transfer completion time of the normal-latency frame is earlier than the low-latency frame output start time T (Step S110: Yes), the output contention control unit 23 starts the transfer of the normal-latency frame, and transfers the normal-latency frame entirely (Step S111), thereby completing the transfer of the normal-latency frame.

When the transfer completion time of the normal-latency frame is not earlier than the low-latency frame output start time T (Step S110: No), the output contention control unit 23 determines whether the normal-latency frame length notified from the normal-latency frame length detection unit 12 is larger than the frame length divisible by the IET (Step S112). As discussed in relation to Step S106, the IET-divided normal-latency frame should meet requirements about the minimum frame length. For example, when the post-division minimum frame length is specified to be 64 bytes, the frame length of the pre-division normal-latency frame must be 124 bytes or more. A 4-byte frame check sequence (FCS) is appended in a format of the IET divided frame to a leading frame of the divided normal-latency frame, or to a frame that is neither such a leading frame nor a last frame, so the division is performed to obtain a frame of 60 bytes.

When the normal-latency frame length is larger than a frame length divisible by the IET (Step S112: Yes), the output contention control unit 23 transfers the normal-latency frame at time earlier than the low-latency frame output start time T to the extent that satisfies the IET divisible condition, and suspends the transfer of the normal-latency frame (Step S113).

When the normal-latency frame length is equal to or smaller than the frame length divisible by the IET (Step S112: No), the output contention control unit 23 cannot transfer the normal-latency frame by the low-latency frame output start time T; therefore, the output contention control unit 23 does not start the transfer of the normal-latency frame (Step S114).

Reference is made back to Step S109. When the output contention control unit 23 determines that the normal-latency frame is not stored in the normal-latency frame transmission buffer 16 (Step S109: No), the output contention control unit 23 does not start the transfer of the normal-latency frame (Step S115).

After Steps S105, S106, S111, and S113 to S115, the output contention control unit 23 determines whether the low-latency frame output start time T has been reached (Step S116). When the low-latency frame output start time T has not been reached (Step S116: No), the output contention control unit 23 returns to Step S103. When the low-latency frame output start time T has been reached (Step S116: Yes), the output contention control unit 23 starts output of the low-latency frame and transfers the low-latency frame entirely (Step S117).

After the process of Step S117, the transfer apparatus 8 returns to Step S101 and repeatedly executes the above-described processes.

Figure 5:
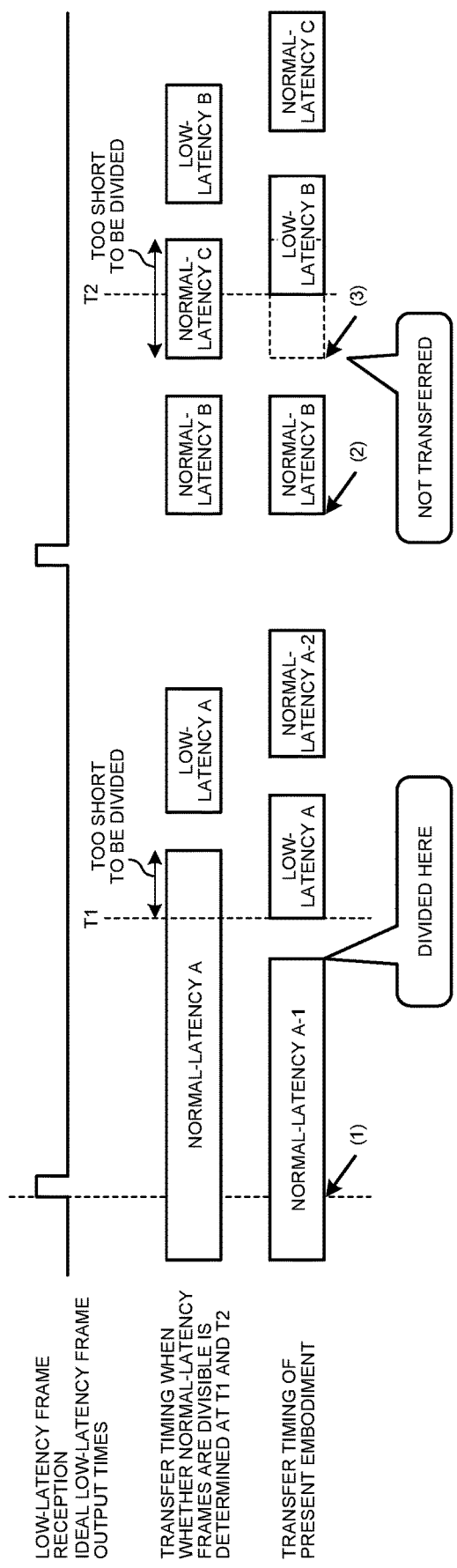
FIG. 5 is a diagram illustrating an effect of suppressing latency of low-latency frames due to output control performed in the transmission unit of the transfer apparatus according to the first embodiment.

FIG. 5 is a diagram illustrating an effect of suppressing latency of low-latency frames by performing output control in the transmission unit 17 of the transfer apparatus 8 according to the first embodiment. In FIG. 5, timings of determinations denoted by reference numerals (1), (2) and (3) indicate Step S103 of the flowchart of FIG. 4. Reference numeral (1) indicates that the procedure proceeds to Step S106, reference numeral (2) indicates that the procedure proceeds to Step S111, and reference numeral (3) indicates that the procedure proceeds to Step S114. It is to be noted that reference numeral (3) indicates a pattern in which the procedure proceeds to Step S114 via the determination of "No" in Step S116 after the process of (2). In FIG. 5, low-latency frame reception indicates timing at which the transmission unit 17 receives the low-latency frame reception notification from the low-latency frame transmission buffer 15. Ideal low-latency frame output times T1 and T2 illustrated in FIG. 5 are each the low-latency frame output start time T described above.

Assuming that whether normal-latency frames are divisible is determined at timing of the low-latency frame output start times T1 and T2, the timing at which to transfer a low-latency frame follows completion of the transfer of a normal-latency frame if the normal-latency frame cannot be divided at the low-latency frame output start time T1 or T2. Specifically, a low-latency frame A is transferred after a normal-latency frame A, and a low-latency frame B is transferred after a normal-latency frame C. Therefore, the start of the transfer of the low-latency frames will be delayed from the ideal low-latency frame output start times T1 and T2.

On the other hand, in the present embodiment, the transfer apparatus 8 determines whether the normal-latency frames can be divided at timings (1) to (3) earlier than the low-latency frame output start times T1 and T2. As illustrated in FIG. 5, the transfer apparatus 8 suspends the transfer of the normal-latency frame before the low-latency frame output start time T1. In addition, the transfer apparatus 8 does not newly start the transfer of the normal-latency frame before the low-latency frame output start time T2. Specifically, the low-latency frame A is transferred after a divisional normal-latency frame A-1, and the low-latency frame B is transferred after a normal-latency frame B. A divisional untransferred normal-latency frame A-2 is transferred after the low-latency frame A, and the normal-latency frame C is transferred after the low-latency frame B. As a result, the time at which to start outputting the low-latency frame having the maximum length can be set to the low-latency frame output start time T1 or T2. In a case where the low-latency frame does not have the maximum length, the output start time at which the low-latency frames equivalent to one frame are stored is time at which to determine whether the normal-latency frame can be divided, so the transfer apparatus 8 starts the transfer of the low-latency frame at time similar to time in conventional cases.

Next, a hardware configuration of the transfer apparatus 8 will be described. In the transfer apparatus 8, the reception unit 11, the normal-latency frame length detection unit 12, the combination buffer 13, the switching processing unit 14, the low-latency frame transmission buffer 15, the normal-latency frame transmission buffer 16, and the transmission unit 17 are implemented by a processing circuit. That is, the transfer apparatus 8 includes a processing circuit for identifying and sorting received frames into a low-latency frame and a normal-latency frame, detecting the frame length of each normal-latency frame, combining normal-latency frames divided by the IET, determining a port to which a frame is transferred and delivering the frame, storing frames in a transmission buffer by frame type, and performing output contention control of low-latency frames and normal-latency frames by the IET. The processing circuit may be dedicated hardware, or a central processing unit (CPU) and a memory, the CPU executing a program stored in the memory.

Figure 6:
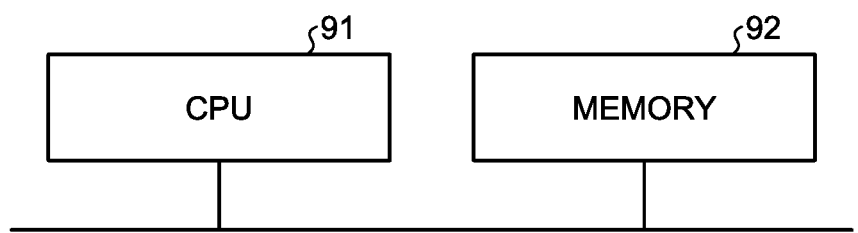
FIG. 6 is a diagram illustrating an example of a case where the transfer apparatus according to the first embodiment is made up of a CPU and a memory.

FIG. 6 is a diagram illustrating an example of a case where the transfer apparatus 8 according to the first embodiment is made up of a CPU and a memory. When the processing circuit is made up of the CPU 91 and the memory 92, the functions of the transfer apparatus 8 are implemented by software, firmware, or a combination of software and firmware. The software or the firmware is described as a program and stored in the memory 92. In the processing circuit, the CPU 91 reads and executes the program stored in the memory 92, thereby implementing each function. That is, where the reception unit 11, the normal-latency frame length detection unit 12, the combination buffer 13, the switching processing unit 14, the low-latency frame transmission buffer 15, the normal-latency frame transmission buffer 16, and the transmission unit 17 are implemented by the processing circuit, the transfer apparatus 8 includes the memory 92 for storing programs to result in performance of: a step of identifying and sorting received frames into a low-latency frame and a normal-latency frame; a step of detecting the frame length of each normal-latency frame; a step of combining normal-latency frames divided by the IET; a step of determining a port to which a frame is transferred and delivering the frame; a step of storing frames in a transmission buffer by frame type; and a step of performing output contention control of low-latency frames and normal-latency frames by the IET. It can also be said that these programs cause a computer to execute procedures and methods of the transfer apparatus 8. The CPU 91 may be a processing unit, an arithmetic unit, a microprocessor, a microcomputer, a processor, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disk, or a digital versatile disc (DVD).

Figure 7:
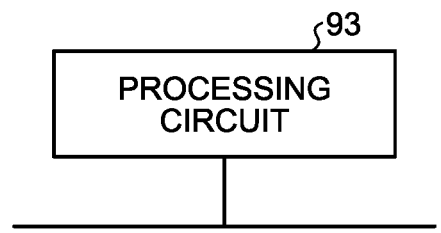
FIG. 7 is a diagram illustrating an example of a case where the transfer apparatus according to the first embodiment is made up of dedicated hardware.

FIG. 7 is a diagram illustrating an example of a case where the transfer apparatus 8 according to the first embodiment is made up of dedicated hardware. When the processing circuit is the dedicated hardware, the processing circuit 93 illustrated in FIG. 7 corresponds to, for example, a single circuit, a composite circuit, a programmed processor, a parallel programmed processor, an application specific integrated circuit (ASIC), a field programmable gate array (FPGA), or a combination thereof. Functions of the transfer apparatus 8 may be individually implemented by the processing circuits 93, or the functions may be collectively implemented by the processing circuit 93.

A part of the functions of the transfer apparatus 8 may be implemented by dedicated hardware and another part thereof may be implemented by software or firmware. Thus, the processing circuit can implement each of the above-described functions by dedicated hardware, software, firmware, or a combination thereof.

As described above, according to the present embodiment, the transfer apparatus 8 that accommodates a plurality of application systems having different transfer speeds and is used in a network that performs transfer control by the IET calculates low-latency frame output start time T upon receiving a low-latency frame, and determines whether to suspend the transfer of the normal-latency frame or whether not to start the transfer of the normal-latency frame, before the low-latency frame output start time T. Assuming that the output line speed is higher than the input line speed, thus, the transfer apparatus 8 can start the transfer of the low-latency frame at the low-latency frame output start time T, thereby suppressing the transfer latency of the low-latency frame. That is, it is possible to minimize the latency time of the low-latency frame having the maximum length that requires low-latency transfer.

Second Embodiment

In the first embodiment, the low-latency frame length information 31 is set in the time calculation unit 21. In the present embodiment, the low-latency frame length information 31 is acquired using identification information on a frame arriving at a transfer apparatus. The second embodiment differs from the first embodiment in respects as described hereinbelow.

Figure 8:
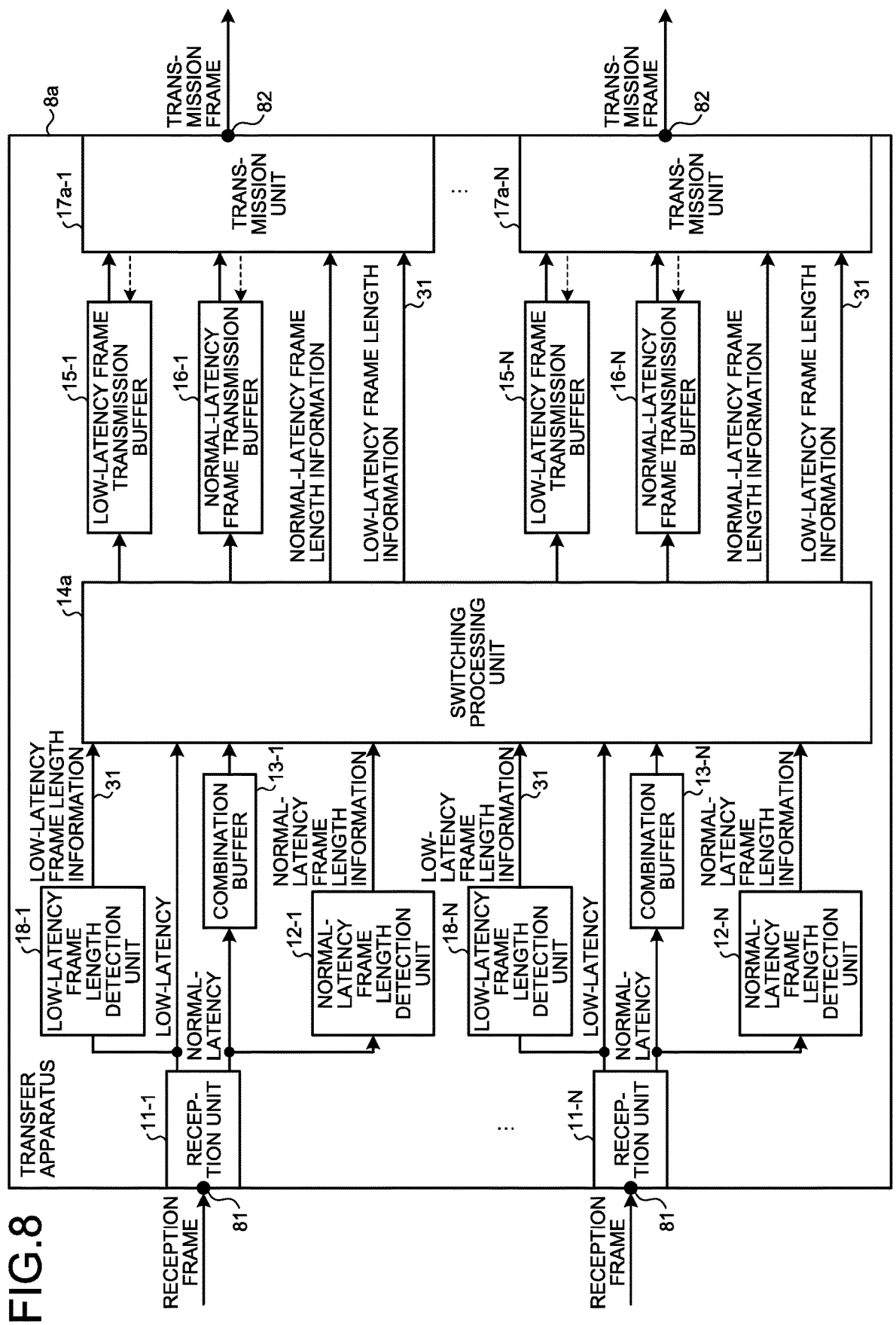
FIG. 8 is a block diagram illustrating an example configuration of a transfer apparatus according to a second embodiment.

FIG. 8 is a block diagram illustrating an example configuration of a transfer apparatus 8a according to a second embodiment. The transfer apparatus 8a is obtained by replacing the switching processing unit 14 and the transmission units 17-1 to 17-N of the transfer apparatus 8 with a switching processing unit 14a and transmission units 17a-1 to 17a-N, and adding low-latency frame length detection units 18-1 to 18-N. Hereinafter, each of the transmission units 17a-1 to 17a-N is referred to as the transmission unit 17a when the transmission units 17a-1 to 17a-N need not be individually referred to. Each of the low-latency frame length detection units 18-1 to 18-N is referred to as the low-latency frame length detection unit 18 when the low-latency frame length detection units 18-1 to 18-N need not be individually referred to.

When the frame length of a low-latency frame can be uniquely determined from identification information such as a MAC source address or a VLAN identifier (ID) of each frame transmitted and received by a communication apparatus connected to the transfer apparatus 8a, the low-latency frame length detection unit 18 stores correspondence between the identification information and the frame length in a form of a table. The low-latency frame length detection unit 18 searches the table on the basis of the identification information inside the frame of the low-latency frame received by the transfer apparatus 8a, and detects the frame length of the corresponding low-latency frame. The low-latency frame length detection unit 18 outputs the low-latency frame length information 31, which is the frame length of the detected low-latency frame, to the switching processing unit 14a.

In addition to the function of the switching processing unit 14, the switching processing unit 14a outputs the low-latency frame length information 31 acquired from the low-latency frame length detection unit 18 to the transmission unit 17a of the output port 82, which is a destination of output of the low-latency frame corresponding to the low-latency frame length information 31.

The transmission unit 17a acquires the information on the low-latency frame length information 31 not through previous setting by an administrator of the communication system 1, but from the low-latency frame length detection unit 18 via the switching processing unit 14a. The transmission unit 17a is different from the transmission unit 17 only in the method of acquiring the low-latency frame length information 31, and other processes thereof are the same as the processes of the transmission unit 17.

As described above, according to the present embodiment, the transfer apparatus 8a acquires the low-latency frame length information 31 from the identification information on the received low-latency frame in which case the same effect as that in the first embodiment can be obtained. In addition, the transfer apparatus 8a can change the low-latency frame length depending on the VLAN when it connects to a plurality of VLANs and the low-latency frame lengths of the low-latency frames transferred in the VLANs are different from one another.

The configurations described in the embodiments above are merely examples of the content of the present invention and can be combined with other known technology and part thereof can be omitted or modified without departing from the gist of the present invention.

REFERENCE SIGNS LIST 1 communication system; 2 to 7 communication apparatus; 8, 8a transfer apparatus; 11-1 to 11-N reception unit; 12-1 to 12-N normal-latency frame length detection unit; 13-1 to 13-N combination buffer; 14, 14a switching processing unit; 15, 15-1 to 15-N low-latency frame transmission buffer; 16, 16-1 to 16-N normal-latency frame transmission buffer; 17, 17-1 to 17-N, 17a-1 to 17a-N transmission unit; 18-1 to 18-N low-latency frame length detection unit; 21 time calculation unit; 22 output frame length management unit; 23 output contention control unit; 24 output frame selector; 81 input port; 82 output port.

The invention claimed is:

1. A transfer apparatus having an input port and an output port, an input line speed of the input port and an output line speed of the output port being capable of being set to differ from each other, the transfer apparatus comprising, for each output port:

a low-latency frame transmission buffer to store a low-latency frame received at the input port;

a normal-latency frame transmission buffer to store a normal-latency frame that is a frame received at the input port, the normal-latency frame being permitted to be transferred with higher latency than the low-latency frame;

a time calculator to calculate output start time of the low-latency frame by using information on a frame length of the low-latency frame, the input line speed, and the output line speed when the low-latency frame is received; and an output contention controller to use the output start time to control transfer of the low-latency frame and control transfer of the normal-latency frame between time of reception of notification of the output start time from the time calculator and the output start time.

2. The transfer apparatus according to claim 1, wherein when the output line speed is higher than the input line speed, the time calculator calculates the output start time at which the low-latency frame is transferable without error, and the output contention controller starts transfer of the low-latency frame on a basis of the output start time.

3. The transfer apparatus according to claim 2, wherein in a case where the normal-latency frame is being transferred, when transfer of the normal-latency frame is completable before the output start time, the output contention controller completes the transfer of the normal-latency frame, and when the transfer of the normal-latency frame is not completable before the output start time, the output contention controller divides the normal-latency frame into a first normal-latency frame and a second normal-latency frame following the first normal-latency frame, the second normal-latency frame having a divisible frame length, and suspends the transfer of the normal-latency frame.

4. The transfer apparatus according to claim 3, wherein in interrupting the transfer of the normal-latency frame, the output contention controller transfers the normal-latency frame until the output start time or time of completion of transfer of a frame length obtained by excluding a divisible minimum frame length from an untransferred portion of the normal-latency frame, whichever comes earlier.

5. The transfer apparatus according to claim 3, wherein in interrupting the transfer of the normal-latency frame, the output contention controller transfers the first normal-latency before the output start time, transfers the low-latency frame at the output start time, and the transfers the second normal-latency frame after the output start time.

6. The transfer apparatus according to claim 2, wherein in a case where the normal-latency frame is not transferred but the normal-latency frame is stored in the normal-latency frame transmission buffer, the output contention controller starts the transfer of the normal-latency frame and completes the transfer of the normal-latency frame when the normal-latency frame is transferable by the output start time, and the output contention controller does not start the transfer of the normal-latency frame when the normal-latency frame is not transferable by the output start time.

7. A frame transfer method in a transfer apparatus having an input port and an output port, an input line speed of the input port and an output line speed of the output port being capable of being set to differ from each other, when the transfer apparatus comprises, for the output port: a low-latency frame transmission buffer to store a low-latency frame received at the input port; a normal-latency frame transmission buffer to store a normal-latency frame that is received at the input port, the normal-latency frame being permitted to be transferred with higher latency than the low-latency frame; a time calculator; and an output contention controller, the method comprising:

a calculation step of calculating output start time of the low-latency frame by using information on a frame length of the low-latency frame, the input line speed, and the output line speed, when the low-latency frame is received; and a control step of using the output start time to control transfer of the low-latency frame and control transfer of the normal-latency frame between time of reception of notification of the output start time from the time calculator and the output start time.

* * * * *